United States Patent [19]
Yamada et al.

[11] Patent Number: 5,769,262
[45] Date of Patent: Jun. 23, 1998

[54] THERMALLY-INSULATED DOUBLE-WALLED SYNTHETIC-RESIN CONTAINER

[75] Inventors: Masashi Yamada; Yasuhiko Komiya; Atsuhiko Tanaka; Seiichi Itoh; Hidefumi Kamachi, all of Tokyo, Japan

[73] Assignee: Nippon Sanso Corporation, Tokyo, Japan

[21] Appl. No.: 827,928

[22] Filed: May 2, 1996

[30] Foreign Application Priority Data

| May 10, 1995 | [JP] | Japan | ..................................... 7-111892 |
| Mar. 1, 1996 | [JP] | Japan | ..................................... 8-045014 |

[51] Int. Cl.⁶ .................................................. B65D 81/18
[52] U.S. Cl. ..................... 220/426; 220/422; 220/423; 215/13.1
[58] Field of Search ................................ 215/12.1, 13.1; 220/420–426

[56] References Cited

U.S. PATENT DOCUMENTS

| 1,165,952 | 12/1915 | Dunlap ..................................... 220/425 |
| 2,643,021 | 6/1953 | Freedman . |
| 3,295,709 | 1/1967 | Herrick et al. ........................... 220/420 |
| 3,513,531 | 5/1970 | Humphress et al. ..................... 220/425 |
| 4,674,674 | 6/1987 | Patterson et al. ........................ 220/420 |
| 5,678,725 | 10/1997 | Yamada et al. .......................... 220/426 |

FOREIGN PATENT DOCUMENTS

| A-0 667 483 | 8/1995 | European Pat. Off. . |
| A-14 29 793 | 5/1969 | Germany . |
| A-25 37 491 | 4/1976 | Germany . |
| 8505501 | 6/1985 | Germany . |
| 62-85267 | 5/1987 | Japan . |
| A-2 163 097 | 2/1986 | United Kingdom . |

OTHER PUBLICATIONS

PTO 96–4460 Translation of Japan 62–085267, Jul. 1996.

PTO 96–4416 Translation of German G 85 05 501.8, Jul. 1996.

*Primary Examiner*—Stephen J. Castellano
*Attorney, Agent, or Firm*—Darby & Darby

[57] ABSTRACT

A thermally-insulated double-walled container is disclosed made of synthetic resin which is formed by joining together an inner container and an outer container in a unitary fashion to form a space therebetween; wherein a thermoinsulating layer is formed in the space between the inner container and the outer container by filling the space with at least one low thermoconductive gas selected from the group consisting of xenon, krypton, and argon; and wherein the inner container and the outer container are multilayer molded from different synthetic resin materials. The container provides an excellent gas-barrier capacity without requiring plating of the outer surface of the inner container or the inner surface of the outer container in the double walled container and maintains its mechanical strength over a long period of time and having an excellent thermoinsulating capacity. The container is suitable as a thermos, cooler box, ice cooler, thermoinsulated cup, insulated lunch box, or the like.

23 Claims, 4 Drawing Sheets

THERMALLY-INSULATED DOUBLE-WALLED SYNTHETIC-RESIN CONTAINER

BACKGROUND OF THE INVENTION

1. Field of the Invention

The present invention relates to a thermoinsulated double walled container that may be employed for a thermos, cooler box, ice cooler, thermoinsulated cup, insulated lunch box, or the like. More specifically, the present invention relates to a thermally-insulated double-walled synthetic-resin container which employs inner and outer containers formed by multilayer molding of different synthetic resins in an inner container and an outer container.

2. Description of the Related Art

Double walled containers made of glass, synthetic resins, or metals such as stainless steel or the like have been employed conventionally for this kind of thermoinsulated double walled container. A container formed of a synthetic resin offers numerous advantages, including being lightweight, easily molded, able to assume a variety of shapes, and inexpensive to produce. Accordingly, numerous advances have been made in the development of these thermally-insulated double-walled synthetic-resin containers. Among these thermally-insulated double-walled synthetic-resin containers, there is a vacuum double-walled structure in which a vacuum layer is created in the space between the double walls, and an thermal insulation structure in which insulating material such as foam is used to fill the space between the double walls. However, in the case of the former, restrictions must be placed on the shape of the container in order to obtain a pressure resistant structure, and production costs are high, while in the case of the latter, the thermoinsulating capacity is poor and the thermoinsulating layer becomes thick causing the effective volume ratio to decrease. To resolve these problems, a thermally-insulated double-walled synthetic-resin container was proposed in which the space between the double walls is filled with a gas which has a low rate of thermoconductivity. Furthermore, in order to increase the gas-barrier capacity of the thermoinsulating layer, which is formed by filling the space between the double walls with a gas of low thermoconductivity, in this thermally-insulated double-walled synthetic-resin container, chemical or electroplating is used to form a metallic coating to the outer surface of the inner container and to the inner surface of the outer container which are in contact with the thermoinsulating layer.

However, when forming a double walled container by joining the mouth openings of each of the inner container and the outer container in a unitary fashion, it may not be possible to obtain sufficient joining if there is metallic coating remaining around the area of joining between the inner and outer containers. As a result, when forming the metallic coating to the inner surface of the outer container and the outer surface of the inner container, it is necessary to perform masking by some method of the area of joining in order to prevent formation of the metallic coating there. Further, a opening for charging gas provided for introducing a low thermoconductive gas into the thermoinsulating layer must be sealed by bonding or welding a sealing plate thereto. Thus, in order to ensure that bonding or welding can be carried out completely, it is also necessary to carry out masking of the opening for charging gas to prevent formation of the metallic coating there. Since masking of this type demands a high degree of accuracy, it becomes very expensive. Further, an additional disadvantage is incurred in that the cost of electroplating or the like after masking also becomes expensive.

Moreover, when a synthetic resin material having a high gas-barrier capacity is employed in the formation of a thermoinsulated double walled container, it is generally the case that many of these resins are highly hygroscopic. When these resins absorb moisture, their capacity to act as a gas-barrier deteriorates substantially over time. Further, depending upon the type of resin, the mechanical strength may decrease, with resins which are highly hygroscopic experiencing a deterioration in mechanical strength due to absorption of moisture.

SUMMARY OF THE INVENTION

Accordingly, the present invention has as its objective the provision at low cost of a thermally-insulated double-walled synthetic-resin container wherein an excellent gas-barrier capacity is obtained without requiring plating of the outer surface of the inner container or the inner surface of the outer container in the double walled container, the container maintaining its mechanical strength over a long period of time and having an excellent thermoinsulating capacity.

The thermally-insulated double-walled synthetic-resin container of the present invention is provided with inner and outer containers, and is formed by joining the inner container and the outer container together in a unitary manner to form a space therebetween. A thermoinsulating layer is formed in the space between the inner and outer containers by filling the space with at least one gas having a low thermoconductivity rate from among the gases xenon, krypton, and argon. The inner and outer containers are formed by multilayer molding of different synthetic resins.

In this thermally-insulated double-walled synthetic-resin container, the inner container and the outer container may be formed using two-color molding wherein each of the containers has a bilayer comprising an inner layer and an outer layer. Moreover, these outer layers and inner layers may be formed from different synthetic resin materials.

In the case of a container in which the inner and outer containers are two-color molded from synthetic resins in which the inner and outer layers are different, synthetic resins are selected which are resistant to the respective environments to which the inner and outer layers of the inner container and the inner and outer layers of the outer container will be exposed. As a result, thermoinsulating capacity and mechanical strength can be maintained over a long period of time.

Further, the outer layer of the inner container and the inner layer of the outer container may be formed of a resin having a high gas-barrier capacity, with the inner layer of the inner container and the outer layer of the outer container formed of a moisture resistant resin.

In the case of two-color molding in which the outer layer of the inner container and the inner layer of the outer container are formed of a resin having a high gas-barrier capacity, while the inner layer of the inner container and the outer layer of the outer container are formed of a moisture resistant resin. As a result, the low thermoconductive gas which fills the space between the inner and outer containers cannot readily pass though the high gas-barrier synthetic resin layer which is in contact with the thermoinsulated layer between the inner and outer containers. At the same time, the external atmosphere cannot easily pass through this high gas-barrier synthetic resin layer to enter into the thermoinsulating layer. In addition, the inner layer of the inner container and the outer layer of the outer container which are in contact with the atmosphere outside the thermoinsulated double walled container do not readily absorb moisture, thus the moisture resistance of the container increases.

Further, the inner container and the outer container may also be formed by means of sandwich molding, wherein each container has an inner layer, an outer layer, and an intermediate layer formed between these inner and outer layers. The inner and outer layers and the intermediate layer may be formed of different synthetic resins.

In the case of a container wherein a different synthetic resin is sandwich molded between the inner and outer layers in each of the inner and outer containers, this intermediate layer resin is protected by the inner and outer layers of the containers. By selecting a synthetic resin which is resistant to the environments to which the inner and outer layers will be exposed, the thermoinsulating capacity and the mechanical strength of the container can be maintained over a long period of time.

Moreover, the inner and outer layers of the inner container and the outer container may also be formed of a moisture resistant resin, while the intermediate layer may be formed of a gas-barrier resin.

In the case of sandwich molding, the inner and outer layers of the inner container and the outer container are formed of a moisture resistant resin, while the intermediate layers of the inner container and the outer container are formed of a gas-barrier resin. As a result, this prevents deterioration in the container's performance caused by the gas-barrier resin in the intermediate layer becoming wet. Thus, the resin's high gas-barrier capacity can be maintained over a long period of time. As a result, the high gas-barrier synthetic resin layer in contact with the thermoinsulating layer, or the high gas-barrier synthetic resin layer in the intermediate layer are protected by the layer of moisture resistant synthetic resin which is in contact with the outside atmosphere. Accordingly, a deterioration in mechanical strength and gas-barrier capacity due to absorption of moisture by the high gas-barrier synthetic resin is prevented. Thus, the container is maintained in a good condition, with the thermoinsulating capacity and mechanical strength which the thermoinsulated double walled container initially demonstrated being maintained over a long period of time.

Moreover, a opening for charging gas of a diameter of 0.1 to 3 mm is formed in the wall of either the inner container or the outer container. This opening for charging gas may be designed to be sealed with a sealing plate which is multilayer molded using a gas-barrier resin and a moisture resistant resin.

By forming a opening for charging gas of a diameter of 0.1 to 3 mm in the wall of either the inner container or the outer container, and sealing the opening for charging gas with a sealing plate which is formed by two-color molding of a gas-barrier resin and a moisture resistant resin, or with a sealing plate which is formed by sandwich molding a gas-barrier resin as an intermediate layer between inner and outer layers of a moisture resistant resin, the diameter of the sealing area becomes smaller and the risk that gas will leak from the sealing area during sealing is reduced. Moreover, in the case where employing a two-color molded sealing plate to seal a opening for charging gas that is formed in the outer container, the inner and outer layers of the sealing plate may be molded from a synthetic resin having the same characteristics as the inner and outer layers of the outer container. When sandwich molding the sealing plate, the inner and outer layers and the intermediate layer of the sealing plate may be molded using synthetic resins having the same characteristics as the resins employed for the inner and outer layers and the intermediate layer of the inner container and outer container. Since the opening for charging gas is sealed with a sealing plate of this type, a sealing area having a gas-barrier capacity, as well as moisture resistance and mechanical strength characteristics identical to those of the inner and outer containers can be obtained. Thus, gas does not leak in through or out from the sealing plate. Additionally, since the sealing plate is attached to the opening for charging gas by bonding or welding, its attachment is easy.

A metallic radiation shielding material may be disposed to at least one of either the outer surface of the inner container or the inner surface of the outer container, or to the space between the inner and outer containers. This metallic radiation shielding material may be one material selected from the group comprising aluminum foil, copper foil, or metalized tape.

By disposing a metallic radiation shielding material, and in particular a material selected from the group comprising aluminum foil, copper foil and metalized tape, to at least one of either the outer surface of the inner container or the inner surface of the outer container, or to the space between the inner and outer containers, it becomes possible to prevent radiant heat transmission at low cost as compared to the case where a metallic coating of electroplating or the like is formed to the inner surface of the outer container and the outer surface of the inner container which are in contact with the thermoinsulating layer. Accordingly, it is possible to provide a thermoinsulated double walled container having an excellent heat retention capacity at low cost.

DETAILED DESCRIPTION OF THE PREFERRED EMBODIMENTS

Figure 1:
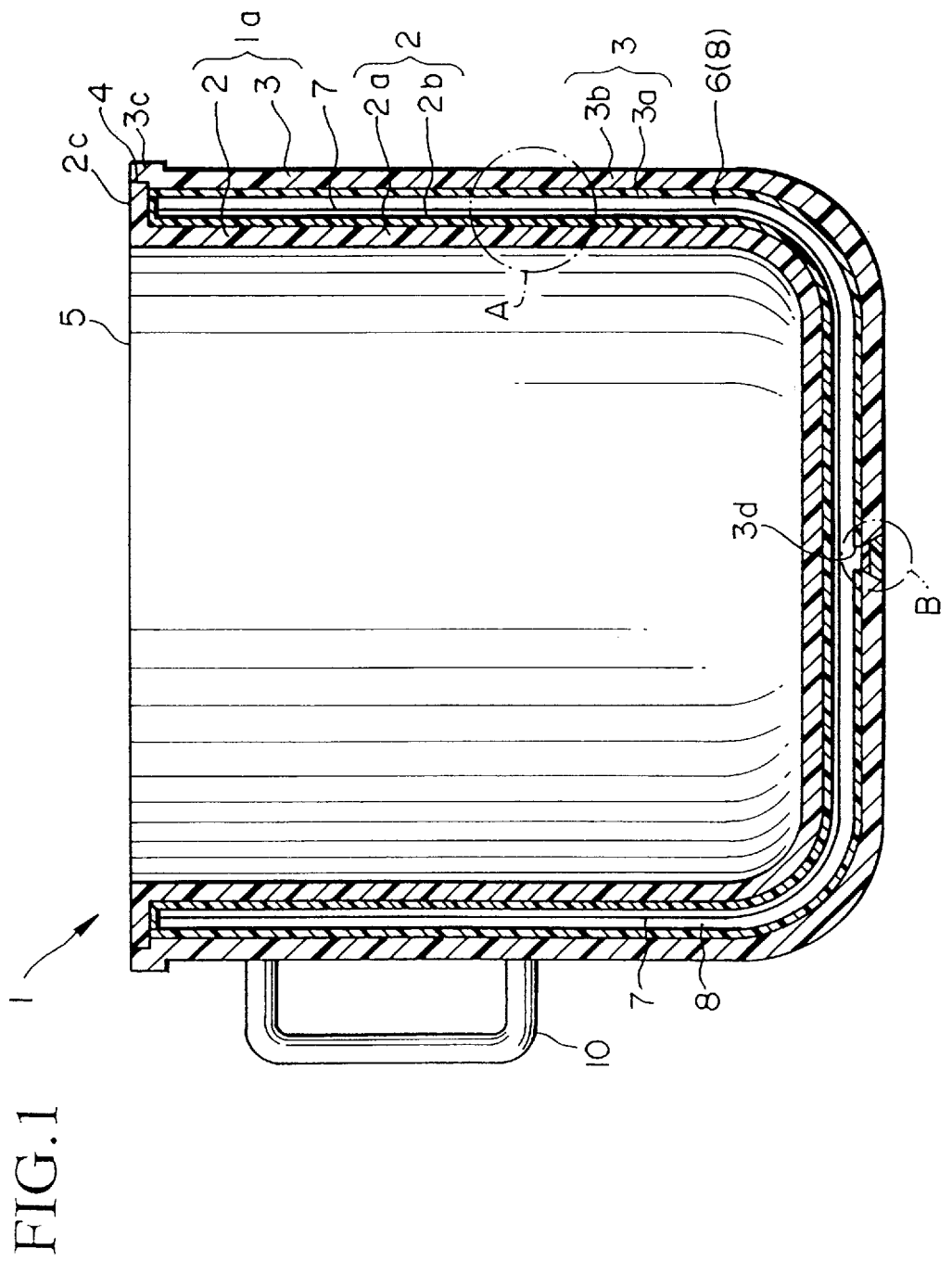
FIG. 1 is a front view in cross-section of a first example of the thermally-insulated double-walled synthetic-resin container according to the present invention.
Figure 2:
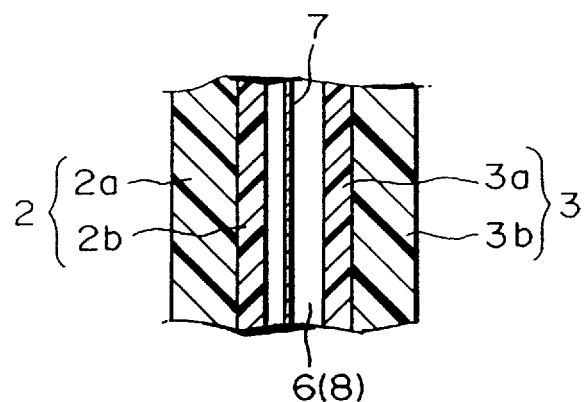
FIG. 2 is an enlarged view of the part indicated by A in FIG. 1.
Figure 3:
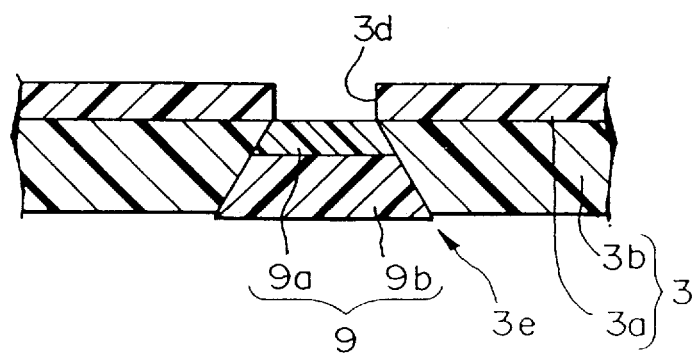
FIG. 3 is an enlarged view of the part indicated by B in FIG. 1.

FIGS. 1 through 3 show a first example of the thermally-insulated double-walled synthetic-resin container of the present invention. In this example, the thermally-insulated double-walled synthetic-resin container of the present invention is suitably employed in a thermoinsulated cup 1 (thermoinsulated mug) such as shown in FIG. 1.

In the thermoinsulated cup 1, a space 6 is formed between an inner container 2, which is two-color molded into a bilayer of an inner container inner layer 2a and an inner container outer layer 2b, and an outer container 3, which is two-color molded into a bilayer of an outer container inner layer 3a and an outer container outer layer 3b. A double walled container 1a is formed by joining inner container 2 and outer container 3 in a unitary fashion at a mouth joining area 4 between their respective flanges 2c, 3c. Further, a radiation shielding material 7 consisting of a metal foil is disposed to space 6 between inner container 2 and outer container 3. A thermoinsulating layer 8 is formed by filling space 6 with at least one type of low thermoconductive gas selected from the group of xenon, krypton, and argon. This thermoinsulated cup 1 is formed in the shape of a cylinder with a bottom, and has an opening 5 formed at the upper edge thereof.

A opening 3d for charging gas is formed in the bottom of outer container 3, and is sealed by bonding or welding a two-color molded sealing plate 9 thereto. Additionally, a handle 10 is attached to the side of outer container 3.

Space 6 is filled with at least one type of low thermoconductive gas selected from the group of xenon, krypton, and argon. These gases have thermoconductivity rates κ which are smaller than that of air ($κ=2.41×10^{-2}$ W·m$^{-1}$·K$^{-1}$ at 0° C.), being $κ=0.52×10^{-2}$ W·m$^{-1}$·K$^{-1}$ at 0° C. in the case of xenon, $κ=0.87×10^{-2}$ W·m$^{-1}$·K$^{-1}$ at 0° C. in the case of krypton, and $κ=1.63×10^{-2}$ W·m$^{-1}$·K$^{-1}$ at 0° C. in the case of argon. Moreover, these are inert gases. These gases may be used alone or in a mixture of 2 or more. By employing these low thermoconductive gases, it is possible to provide a thermoinsulated double walled container 1 having a high thermoinsulating capacity. Moreover, because these gases are inert, they do not pose a danger to the environment, making them ideal for use. Filling space 6 with these gases is carried out at room temperature and atmospheric pressure.

This thermally-insulated double-walled synthetic-resin container, which is formed by joining an inner container and an outer container in a unitary fashion and filling the space between these inner and outer containers with at least one low thermoconductive gas selected from among xenon, krypton, and argon at room temperature and atmospheric pressure to form a thermoinsulating layer, resolves the defects encountered in conventional products which employ a vacuum double-walled structure or an thermal insulation structure where an insulating material is used to fill the space between the inner and outer containers. As a result, it is possible to provide at low cost a thermally-insulated double-walled synthetic-resin container which has an excellent thermoinsulating capacity (heat retention capacity), a high effective volume ratio, and which can be freely shaped.

Inner container 2 and outer container 3 are two-color molded into bilayers comprising respective inner and outer layers. A synthetic resin material having an excellent gas-barrier capacity (hereinafter, referred to as "gas-barrier resin"), and specifically a resin having a gas permeability rate (ASTM Z 1434-58) as a film material of not more than 0.1 g/m$^2$/24 hr/atm for $O_2$, $N_2$, and $CO_2$, may be employed for inner container outer layer 2b and outer container inner layer 3a. Examples of such resins include polyesters like polyethylene terephthalate, polybutylene terephthalate, and polyethylene naphthalate, as well as various resins such as polyamide, ethylene vinyl alcohol, polyvinylidene chloride, polyacrylonitrile, polyvinyl alcohol and the like. The low thermoconductive gases xenon, krypton, and argon have an atomic diameter which is larger than $O_2$ and $N_2$. Accordingly, the permeability rate of these low thermoconductive gases through the aforementioned gas-barrier resins is smaller than the rates for $O_2$ or $N_2$.

Moreover, a synthetic resin which is heat resistant, moisture resistant (rate of resistance to water-vapor transmission) and is equipped with mechanical strength (hereinafter, referred to as "moisture resistant resin"), and specifically a synthetic resin which is heat resistant with a thermal deformation temperature (ASTM D 648) not less than 100° C. and a water-vapor transmission rate (JIS Z 0208) not more than 50 g/m$^2$/24 hr or less, may be employed for the inner container inner layer 2a and the outer container outer layer 3b. Examples of this type of resin include polypropylene, heat and moisture resistant polycarbonate, and the like. By forming inner container 2 and outer container 3 by means of two-color molding of a gas-barrier resin and a moisture resistant resin, a double walled container 1a which is provided with a high gas-barrier capacity can be formed without forming a metallic coating such as electroplating to the outer surface of inner container 2 and the inner surface of outer container 3. Moreover, the layers of inner and outer containers 2, 3 which are in contact with the external atmosphere demonstrate excellent mechanical strength, as well as resistance to moisture and heat.

Even if a readily moisture absorbent synthetic resin like polyamide is used as the gas-barrier resin employed in inner container outer layer 2b and outer container inner layer 3a in thermoinsulated double walled container 1 formed of two-color molded inner container 2 and outer container 3, it is possible to prevent a deterioration in performance due to absorption of moisture by the gas-barrier resin in contact with thermoinsulating layer 8 because inner container inner layer 2a and outer container outer layer 3b, which are in contact with the external atmosphere, are formed of a moisture resistant resin. Accordingly, the escape of the low thermoconductive gas through the walls of inner and outer containers 2 and 3 is prevented, making is possible to maintain the container's excellent thermoinsulating capacity over a long period of time.

As a method for molding inner container 2 and outer container 3 using two-color molding, a known two-color molding method (multi-color molding method) may be employed, such as, for example, the method disclosed in Plastic Molding Techniques, vol. 10, No. 11, pages 9 through 14 (1993), which uses a two-color/mixed color molding machine and working method.

Inner container 2 and outer container 3 can be joined at mouth joining area 4 between their respective flanges 2c, 3c by employing a heat welding method such as vibration welding, spin welding or heat plate welding, or by means of a bonding method using a synthetic resin bonding agent. If inner container 2 and outer container 3 are joined by means of a heat welding method such as vibration welding, spin welding or heat plate welding, then the joining strength at mouth joining area 4 is high, and an even higher degree of air tightness can be obtained. As a result, the low thermoconductive gas which fills space 6 does not leak from mouth joining area 4. The joined surface of mouth joining area 4 is formed by joining inner container inner layer 2a and outer container outer layer 3b which are each formed of a moisture resistant resin. As a result, even if the gas-barrier resin of outer container inner layer 3a and inner container outer layer 2b around mouth joining area 4 is moisture absorbent, or has low mechanical strength, the gas-barrier resin is protected by the moisture resistant resin. Thus, there is no concern that a deterioration in the container's thermoinsulating capacity will arise from mouth joining area 4.

The opening 3d for charging gas in the bottom of outer container 3 is provided with a diameter in the range of 0.1 to 3 mm. When the diameter of opening 3d for charging gas is less than 0.1 mm, then the process of vacuum evacuating space 6 between inner and outer containers 2 and 3 via opening 3d for charging gas and filling the space with the low thermoconductive gas becomes difficult. In contrast, when the diameter is larger than 3 mm, air can readily mix into the low thermoconductive gas during the sealing of opening 3d for charging gas with sealing plate 9 after filling space 6 with the low thermoconductive gas. Further, opening 3d for charging gas is tapered in this first example, with the diameter getting larger as opening 3d for charging gas extends from the thermoinsulating layer 8 side toward the outside of the container.

Sealing plate 9 is formed by two-color molding a gas-barrier resin and a moisture resistant resin which are identical to those employed in inner and outer containers 2, 3 into a shape which can be inserted into opening 3d for charging gas. Sealing plate 9 is then inserted into opening 3d for charging gas with the gas-barrier resin (inner layer 9a) directed toward thermoinsulating layer 8, and the moisture resistant resin (outer layer 9b) directed toward the outside of the container, and is then bonded in opening 3d for charging gas through the use of a bonding agent. Cyanoacrylate type bonding agents are suitably employed as the bonding agent used here. This bonding agent provides a high degree of air tightness around the area of bonding and provides strong bonding strength instantly. Thus, it is suitably employed as the bonding agent for the sealing of opening 3d for charging gas by sealing plate 9 which is inserted into opening 3d for charging gas immediately following filling of space 6 with a low thermoconductive gas. Further, in addition to using a cyanoacrylate type bonding agent to bond sealing plate 9 in opening 3d for charging gas, joining by means of a heat welding method such as vibration welding, spin welding, heat plate welding or the like is also possible. If opening 3d for charging gas is sealed by means of this type of welding, the strength and durability of the sealed area 3e are improved. Moreover, sealing plate 9 can also be formed by forming a suitably thick plate member by two-color molding of a gas-barrier resin and a moisture resistant resin, cutting this plate member and then working it into a shape which can be inserted into opening 3d for charging gas.

Sealing plate 9 is formed by two-color molding of a gas-barrier resin and a moisture resistant resin which are identical to those employed in inner and outer containers 2, 3. By inserting this sealing plate 9 in opening 3d for charging gas with the gas-barrier resin directed toward the thermoinsulating layer 8 side and the moisture resistant resin directed toward the outside of the container, then the gas-barrier resin on the thermoinsulating layer 8 side can be protected by the moisture resistant resin. Thus, the gas-barrier capacity of sealing plate 9 can be maintained well, without a deterioration in the thermoinsulating capacity arising from around this area.

A metallic radiation shielding material 7 is disposed inside space 6 so as to cover the outer surface of inner container 2. As a result, it is possible to form a structure which prevents radiant heat transmission which is less expensive than the case where a metallic coating such as electroplating or the like is formed to the sides of inner and outer containers 2, 3 which are in contact with thermoinsulating layer 8. Thus, the thermoinsulating effect of thermoinsulated double walled container 1 is improved. Aluminum foil, copper foil, or metalized tape are suitably employed as the radiation shielding material 7, as well as stainless foil, silver foil or paper which has metallic foil attached to both sides thereof.

An explanation will now be made of the method of production of this thermoinsulated cup 1. First, an inner container 2 and an outer container 3 are formed from a gas-barrier resin and a moisture resistant resin using two-color molding. A opening 3d for charging gas is punched in the bottom of outer container 3 during or after molding. In a separate process, a plate member two-color molded from a gas-barrier resin and a moisture resistance resin is punched out and a sealing plate 9 which can be inserted to exactly fit into opening 3d for charging gas is formed.

Next, a metallic radiation shielding material 7 is attached so as to cover the outer surfaces of the cylindrical portion and the bottom of inner container 2. This radiation shielding material 7 is easily affixed to the outer surface of inner container 2 by a bonding agent or the like.

Next, inner container 2 with attached radiation shielding material 7 is inserted into outer container 3. The mouth openings thereof are aligned and bonded together by means of a heat welding method such as vibration welding, spin welding, heat plate welding, or the like, to form a double walled container 1a by joining inner container 2 and outer container 3 in a unitary fashion at the mouth areas thereof.

Next, the air inside space 6 between inner and outer containers 2, 3 is evacuated via opening 3d for charging gas in the bottom of double walled container 1a, and space 6 is filled with a low thermoconductive gas. Opening 3d for charging gas is then sealed with sealing plate 9. This operation may be carried out by employing a device which can be switched between an evacuation system attached to an evacuation pump and a supply system for supplying a low thermoconductive gas, in which packing is disposed to the ends of the pipe in the device which attaches to double-walled container 1a at opening 3d for charging gas. This packing is pushed against the vicinity of opening 3d for charging gas, and space 6 is evacuated by the evacuation system while opening 3d for charging gas is blocked off from the external atmosphere. Next, the device is switched over to the low thermoconductive gas supply system, and space 6 is filled with a low thermoconductive gas. Once space 6 is filled with a low thermoconductive gas, a cyanoacrylate type instant bonding agent is coated dropwise to the tapered opening 3d for charging gas using a dispenser. Then, sealing plate 9 is engaged in opening 3d for charging gas, and is strongly bonded and fixed therein by the hardening of the bonding agent.

Further, as an alternative method, a gas substitution device may be employed which is provided with a chamber which is attached to a vacuum pump and a low thermoconductive gas supply means. A double walled container 1a is placed inside the chamber of this device, and the chamber is vacuum evacuated, thus also evacuating the air inside space 6 between inner and outer containers 2, 3 via opening 3d for charging gas which is in the bottom of double walled container 1. Next, low thermoconductive gas is introduced into the chamber until the pressure is approximately atmospheric pressure, thereby supplying the low thermoconductive gas into space 6 of double walled container 1a. A sealing plate 9 which has been coated with a bonding agent is then engaged in opening 3d for charging gas, sealing it.

As a result, a thermoinsulated cup 1 (thermally-insulated double-walled synthetic-resin container) is formed having a space 6 between its inner and outer containers 2, 3 which is filled with a low thermoconductive gas.

Figure 4:
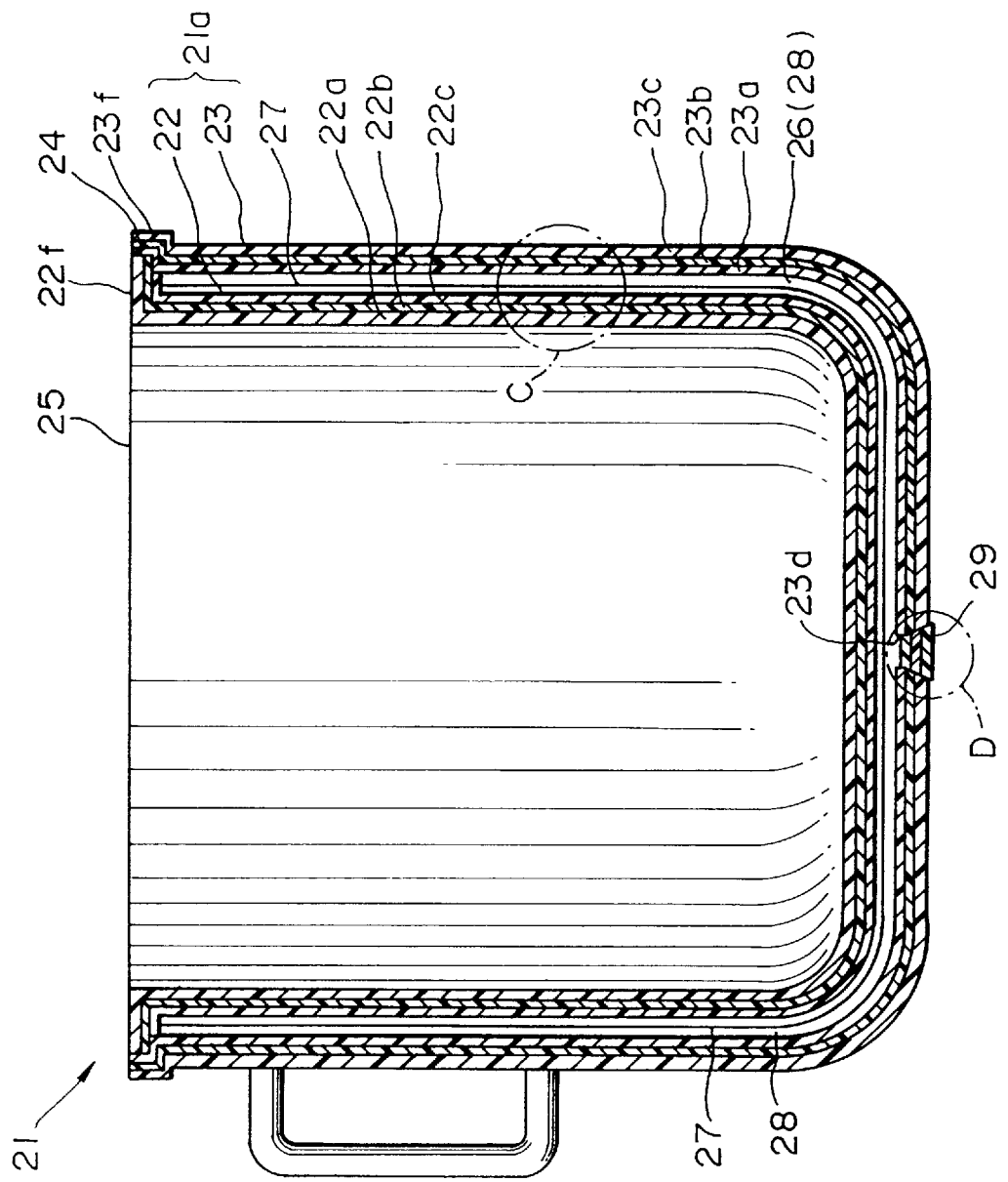
FIG. 4 is a front view in cross-section of a second example of the thermally-insulated double-walled synthetic-resin container according to the present invention.
Figure 5:
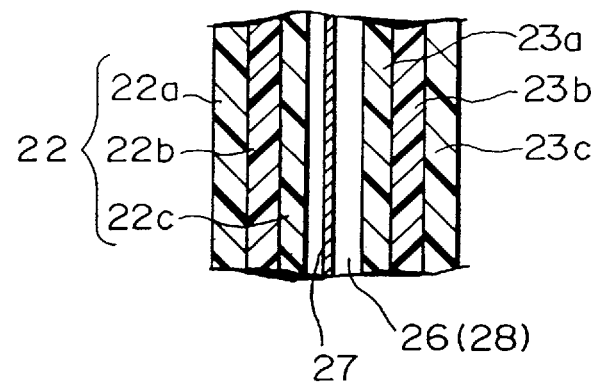
FIG. 5 is an enlarged view of the part indicated by C in FIG. 4.
Figure 6:
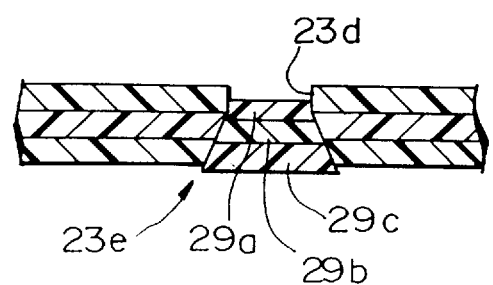
FIG. 6 is an enlarged view of the part indicated by D in FIG. 4.

FIGS. 4 through 6 show a second example of the present invention's thermally-insulated double-walled synthetic-resin container. In this example, the present invention's thermally-insulated double-walled synthetic-resin container is suitably employed in a thermoinsulated cup 21 (thermoinsulated mug) such as shown in FIG. 4.

In thermoinsulated cup 21, a space 26 is formed between a sandwich molded inner container 22, wherein an intermediate layer 22b is sandwiched between an inner layer 22a and an outer layer 22c, and a sandwich molded outer container 23, wherein an intermediate layer 23b is sandwiched between an inner layer 23a and an outer layer 23c. A double walled container 21a is formed by joining inner container 22 and outer container 23 in a unitary fashion at the mouth joining area 24 between their respective flanges 22f, 23f. Further, a radiation shielding material 27 consisting of a metal foil is disposed to space 26 between inner container 22 and outer container 23. A thermoinsulating layer 28 is formed by filling space 26 with at least one type of low thermoconductive gas from among the group of xenon, krypton, and argon. This thermoinsulated cup 21, which is formed in the shape of a cylinder having a bottom, has an opening 25 at the upper edge thereof.

A opening 23d for charging gas is formed in the bottom of outer container 23, and is sealed by bonding or welding a sandwich molded sealing plate 29 thereto.

Space 26 is filled at room temperature and atmospheric pressure with at least one type of low thermoconductive gas selected from among the group of xenon, krypton, and argon. By employing these low thermoconductive gases, it is possible to provide a thermoinsulated cup 21 having a high thermoinsulating capacity.

Inner container 22 and outer container 23 are each molded into respective sandwich structures comprising an inner layer, intermediate layer and outer layer. A gas-barrier resin selected from among various resins such as polyesters like polyethylene terephthalate, polybutylene terephthalate, and polyethylene naphthalate, as well as various resins such as polyamide, ethylene vinyl alcohol, polyvinylidene chloride, polyacrylonitrile, polyvinyl alcohol and the like, may be employed in the intermediate layer 22b of the inner container and the intermediate layer 23b of the outer container.

Further, a moisture resistant resin which is heat resistant, moisture resistance (rate of resistance to water-vapor transmission) and is provided with mechanical strength, such as polypropylene, heat and moisture resistant polycarbonate or the like, may be employed for inner layer 22a and outer layer 22c of inner container 22, and for inner layer 23a and outer layer 23c of outer container 23.

By forming inner container 22 and outer container 23 by means of sandwich molding so that a gas-barrier resin is sandwiched between moisture resistant resins, a double walled container 21a can be formed which has a high gas-barrier capacity even if a metallic coating such as electroplating or the like is not formed to the outer surface of inner container 22 and the inner surface of outer container 23. Further, the layers which are in contact with the external atmosphere in inner and outer containers 22, 23, and the layers which are in contact with the thermoinsulating layer 28 in inner and outer containers 22, 23 have excellent mechanical strength as well as resistance to heat and moisture.

In thermoinsulated cup 21 formed of sandwich molded inner and outer containers 22, 23, the inner container inner layer 22a and outer container outer layer 23c which are in contact with the external atmosphere are formed of a moisture resistant resin. Accordingly, even if a synthetic resin, such as polyamide, which readily absorbs moisture is used as the gas-barrier resin employed for the respective intermediate layers 22b, 23b of inner and outer containers 22, 23, a deterioration in the performance of the container due to absorption of moisture by the gas-barrier resin of intermediate layers 22b, 23b is prevented. Thus, the escape of the low thermoconductive gas through the walls of inner and outer containers 22, 23 is prevented, making is possible to maintain an excellent thermoinsulating capacity over a long period of time. Further, because inner container intermediate layer 22b and outer container intermediate layer 23b are sandwiched by moisture resistant resin, it is possible to prevent deterioration in performance due to absorption of moisture by the gas-barrier resin portions of inner and outer containers 22, 23 during their storage as parts prior to assembly of double walled container 21a. Accordingly, the thermoinsulating capacity of the container is improved.

As a method for molding inner container 22 and outer container 23 using sandwich molding, a known sandwich molding method (multilayer molding method) may be employed, such as, for example, the method disclosed in Plastic Molding Techniques, vol. 10, No. 11, pages 9 through 14 (1993), which uses a two-color/mixed color molding machine and working method.

Inner container 22 and outer container 23 can be joined at the mouth joining area 24 between their respective flanges 22f, 23f by employing a heat welding method such as vibration welding, spin welding or heat plate welding, or by means of a bonding method using a synthetic resin bonding agent.

Moreover, a opening 23d for charging gas of a diameter of 0.1 to 3 mm is formed in the bottom of outer container 23. This opening 23d for charging gas is tapered with the diameter widening as the hole extends from the thermoinsulating layer 28 side toward the outside of the container.

Sealing plate 29 is sandwiched molded into a shape which can be inserted into opening 23d for charging gas by sandwiched molding a gas-barrier resin, which will form intermediate layer 29b, between moisture resistant resins, which will form inner layer 29a which is in contact with thermoinsulating layer 28 and outer layer 29c which is in contact with the external atmosphere, these resins being identical to those employed in inner and outer containers 22, 23. Sealing plate 29 is then inserted into opening 23d for charging gas and bonded with a cyanoacrylate type bonding agent. In addition to using a cyanoacrylate type bonding agent to bond sealing plate 29 in opening 23d for charging gas, joining by means of a heat welding method such as vibration welding, spin welding, heat plate welding or the like are also possible. If opening 23d for charging gas is sealed by means of this type of welding, the strength and durability of sealing area 23e are improved.

Sealing plate 29 is formed by sandwich molding a gas-barrier resin and moisture resistant resins which are identical to those employed in the case of inner and outer containers 22, 23. Thus, the gas-barrier resin of intermediate layer 29b is protected by inner and outer layers 29a, 29c which are formed of a moisture resistant resin, and the gas-barrier capacity of sealing plate 29 can be maintained well. Accordingly, there is no concern that a deterioration in thermoinsulating capacity will arise from around this area.

A metallic radiation shielding material 27 is disposed inside space 26 so as to cover the outer surface of inner container 22. As a result, it is possible to form a structure at a lower cost which prevents radiant heat transmission as compared to forming a metallic coating such as electroplating to the surfaces of inner and outer containers 22, 23 which are in contact with thermoinsulating layer 28. Thus, the thermoinsulating effect of thermoinsulated cup 21 is improved. Aluminum foil, copper foil, or metalized tape are suitably employed as the radiation shielding material 27, as well as stainless foil, silver foil or paper to which metallic foil has been attached to both sides thereof.

An explanation will now be made of the method of production of this thermoinsulated cup 21. First, an inner container 22 and an outer container 23 are formed by means of sandwich molding so that a gas-barrier resin is sandwiched between moisture resistant resins. A opening 23d for charging gas is punched in the bottom of outer container 23 during or after molding. In a separate process, a sealing plate 29 of a shape which can be inserted to exactly fit into opening 23d for charging gas is formed by punching out a plate member sandwich molded so that a gas-barrier resin is sandwiched between moisture resistant resins.

Next, a metallic radiation shielding material 27 is attached so as to cover the outer surfaces of the cylindrical portion and bottom of inner container 22. This radiation shielding material 27 is easily affixed to the outer surface of inner container 22 by a bonding agent or the like.

Next, inner container 22 with attached radiation shielding material 27 is inserted into outer container 23. The mouth areas thereof are aligned and bonded together by means of a heat welding method such as vibration welding, spin welding, heat plate welding, or the like, to form a double walled container 21a by joining inner container 22 and outer container 23 in a unitary fashion at the mouth areas thereof.

Next, the air inside space 26 between inner and outer containers 22, 23 is evacuated via opening 23d for charging gas at the bottom of double walled container 21a, and space 26 is filled with a low thermoconductive gas. Opening 23d for charging gas is then sealed with sealing plate 29. Once space 26 is filled with a low thermoconductive gas, a cyanoacrylate type instant bonding agent is coated dropwise to the tapered opening 23d for charging gas using a dispenser. Then, sealing plate 29 is engaged in opening 23d for charging gas, and is strongly bonded and fixed thereto by the hardening of the bonding agent.

As a result, a thermoinsulated cup 21 (thermally-insulated double-walled synthetic-resin container) is formed wherein the space 26 between inner and outer containers 22, 23 is filled with a low thermoconductive gas.

Thermoinsulated cups 1, 21 (thermally-insulated double-walled synthetic-resin containers) formed in the first and second examples in this way have excellent gas-barrier capacity, resistance to heat and moisture, and mechanical strength even though the steps of electroplating and masking of non-plating areas are omitted. Accordingly, production costs can be greatly reduced. Moreover, in the first example, it is possible to select the synthetic resins for the inner surface of inner container 2 and the outer surface of outer container 3 in response to the specifications of the product. Further, in the second example as well, it is possible to select the synthetic resins for the inner and outer surfaces and intermediate layer of outer container 23 and inner container 22. As a result, the present invention can be suitably employed in a variety of products of varying designs and colors.

Because a thermoinsulating layer 8, 28 is formed in thermoinsulating cup 1, 21 in the first and second examples by introducing at room temperature and atmospheric pressure a low thermoconductive gas into the space 6, 26 between the inner and outer containers, it is not necessary to provide double walled container 1a, 21a with a pressure resistant structure such as is required in the case of a vacuum insulated container. Thus, a container constructed with flat walls, such as a square-shaped container, becomes possible.

Additionally, in the first and second examples, an opening 3d for charging gas or an opening 23d for charging gas was provided in the bottom of outer container 3 or 23. However, an opening 3d for charging gas or opening 23d for charging gas can also be provided in the side surface of flanges 2c of inner container 2 or in the side surface of flanges 22f of inner container 22; in the side surfaces of inner container 2 or 22; in the side surface of outer container 3 or 23; or in the bottom of inner container 2 or 22.

Further, the thermally-insulated double-walled synthetic-resin container of the present invention is not limited to use in thermoinsulated cup 1, 21, but may be employed for a variety of thermoinsulating containers. Additionally, there are no particular limitations placed on the container's shape, size or applications.

Example of Production

To produce the thermoinsulated cup 1 shown in FIG. 1, an inner container 2 and outer container 3 for a double walled container 1a were produced using two-color molding. Polyamide was employed as a gas-barrier resin for the inner container outer layer 2b and outer container inner layer 3a, while heat and moisture resistant polycarbonate was employed as the moisture resistant resin for inner container inner layer 2a and outer container outer layer 3b. During formation of outer container 3, a opening 3d for charging gas was formed in the bottom thereof, while a handle 10 of polycarbonate was formed to the side of outer container 3.

Sealing plate 9 was formed by two-color molding of polyamide and heat and moisture resistant polycarbonate into the shape of a flat plate.

Radiant heat transmission was prevented by using double sided adhesive tape to adhere aluminum foil to the outer surface of inner container 2 as a radiation shielding material. Next, inner container 2 with the adhered aluminum foil was inserted into outer container 3, with the flanges 2c, 3c engaging. The area of these flanges 2c, 3c were joined by vibration welding to form a mouth joining area 4.

Next, with the opening 5 of the obtained double walled container 1a placed downward, a device which could be switched between an evacuation system connected to an evacuation pump and a krypton gas (low thermoconductive gas) supply system and which had packing disposed to the ends of its pipe which attaches to double-walled container 1a at opening 3d for charging gas was employed. The packing was pushed against the vicinity of opening 3d for charging gas, and space 6 was evacuated to a pressure of 10 Torr or less by the device's evacuation system with opening 3d for charging gas blocked off from the external atmosphere. The device was then switched to the krypton gas supply system, and space 6 was filled with krypton gas until a pressure around atmospheric pressure was reached. After filling with krypton gas, a cyanoacrylate type instant bonding agent was coated dropwise to tapered opening 3d for charging gas using a dispenser. Sealing plate 9 was then engaged in opening 3d for charging gas and affixed therein by the hardening of the bonding agent.

The thermoinsulated mug produced in this way was lightweight, had high mechanical strength, and excellent heat retention capacity. Moreover, production costs were less than those required to produce conventional thermoinsulating containers. Additionally, it was confirmed that this thermoinsulating mug maintained the excellent thermoinsulating capacity demonstrated initially over a long period of time.

What is claimed:

1. A thermally-insulated double-walled synthetic-resin container comprising an inner container and an outer container, the thermally-insulated double-walled synthetic-resin container being formed by unitarily joining the inner container and the outer container to enclose a space therebetween;

wherein a thermoinsulating layer is formed in the space between the inner container and the outer container by filling the space with at least one low thermoconductive gas selected from the group consisting xenon, krypton, and argon; and wherein the inner container and the outer container are multilayer molded from different synthetic resin materials.

2. A thermally-insulated double-walled synthetic-resin container according to claim 1, wherein the inner container and the outer container are formed by two-color molding to respectively form a bilayer consisting of an inner layer and an outer layer, the inner layer and the outer layer being formed of different synthetic resin materials.

3. A thermally-insulated double-walled synthetic-resin container according to claim 2,
wherein the outer layer of the inner container and the inner layer of the outer container are formed of a gas-barrier resin, and the inner layer of the inner container and the outer layer of the outer container are formed of a moisture resistant resin.

4. A thermally-insulated double-walled synthetic-resin container according to claim 3,
wherein the gas-barrier resin is a resin having a gas permeability rate as a film material of not more than 0.1 $g/m^2/24$ hr/atm for $O_2$, $N_2$, and $CO_2$.

5. A thermally-insulated double-walled synthetic-resin container according to claim 3,
wherein the gas-barrier resin is a resin selected from the group consisting of polyester, polyamide, ethylene vinyl alcohol, polyvinylidene chloride, polyacrylonitrile, and polyvinyl alcohol.

6. A thermally-insulated double-walled synthetic-resin container according to claim 5,
wherein the gas-barrier resin is polyester selected from the group consisting of polyethylene terephthalate, polybutylene terephthalate, and polyethylene naphthalate.

7. A thermally-insulated double-walled synthetic-resin container according to claim 3,
wherein the moisture resistant resin has a thermal deformation temperature not less than 100° C. and a water-vapor transmission rate not more than 50 $g/m^2/24$ hr.

8. A thermally-insulated double-walled synthetic-resin container according to claim 3,
wherein the moisture resistant resin is a resin selected form the group consisting of polypropylene and heat and moisture resistant polycarbonate.

9. A thermally-insulated double-walled synthetic-resin container according to claim 1,
wherein the inner container and the outer container are formed by sandwich molding so as to each have an outer layer, an inner layer, and an intermediate layer formed between the inner and outer layers, the inner and outer layers being formed of a different synthetic resin material from that forming the intermediate layer.

10. A thermally-insulated double-walled synthetic-resin container according to claim 9,
wherein the inner and outer layers of the inner and outer containers are formed of a moisture resistant resin, and the intermediate layer of the inner and outer containers is formed of a gas-barrier resin.

11. A thermally-insulated double-walled synthetic-resin container according to claim 10,
wherein the gas-barrier resin is a resin having a gas permeability rate as a film material of not more than 0.1 $g/m^2/24$ hr/atm for $O_2$, $N_2$, and $CO_2$.

12. A thermally-insulated double-walled synthetic-resin container according to claim 10,
wherein the gas-barrier resin is a resin selected from the group consisting of polyester, polyamide, ethylene vinyl alcohol, polyvinylidene chloride, polyacrylonitrile, and polyvinyl alcohol.

13. A thermally-insulated double-walled synthetic-resin container according to claim 12,
wherein the gas-barrier resin is polyester selected from the group consisting of polyethylene terephthalate, polybutylene terephthalate, and polyethylene naphthalate.

14. A thermally-insulated double-walled synthetic-resin container according to claim 10,
wherein the moisture resistant resin has a thermal deformation temperature not less than 100° C. and a water-vapor transmission rate not more than 50 $g/m^2/24$ hr.

15. A thermally-insulated double-walled synthetic-resin container according to claim 10,
wherein the moisture resistant resin is a resin selected form the group consisting of polypropylene and heat and moisture resistant polycarbonate.

16. A thermally-insulated double-walled synthetic-resin container according to claim 1,
wherein an opening for charging gas, having a diameter of 0.1 to 3 mm, is formed in one of the inner container and the outer container, the opening for charging gas being sealed with a sealing plate which is multilayer molded using a gas-barrier resin and a moisture resistant resin.

17. A thermally-insulated double-walled synthetic-resin container according to claim 16,
wherein the gas-barrier resin is a resin having a gas permeability rate as a film material of not more than 0.1 $g/m^2/24$ hr/atm for $O_2$, $N_2$, and $CO_2$.

18. A thermally-insulated double-walled synthetic-resin container according to claim 16,
wherein the gas-barrier resin is a resin selected from the group consisting of polyester, polyamide, ethylene vinyl alcohol, polyvinylidene chloride, polyacrylonitrile, and polyvinyl alcohol.

19. A thermally-insulated double-walled synthetic-resin container according to claim 18,
wherein the gas-barrier resin is polyester selected from the group consisting of polyethylene terephthalate, polybutylene terephthalate, and polyethylene naphthalate.

20. A thermally-insulated double-walled synthetic-resin container according to claim 16,
wherein the moisture resistant resin has a thermal deformation temperature not less than 100° C. and a water-vapor transmission rate not more than 50 $g/m^2/24$ hr.

21. A thermally-insulated double-walled synthetic-resin container according to claim 16,
wherein the moisture resistant resin is a resin selected form the group consisting of polypropylene and heat and moisture resistant polycarbonate.

22. A thermally-insulated double-walled synthetic-resin container according to claim 1,
wherein a metallic radiation shielding material is disposed at at least one location selected from the group consisting of the outer surface of the inner container, the inner surface of the outer container, and the space between the inner and outer containers.

23. A thermally-insulated double-walled synthetic-resin container according to claim 22, wherein the metallic radiation shielding material is one selected from the group consisting of aluminum foil, copper foil, and metalized tape.

* * * * *